United States Patent [19]
Lucas et al.

[11] Patent Number: 6,085,285
[45] Date of Patent: Jul. 4, 2000

[54] INTERMIXING DIFFERENT DEVICES ALONG A SINGLE DATA COMMUNICATION LINK BY PLACING A STROBE SIGNAL IN A PARITY BIT SLOT

[75] Inventors: Gregg Steven Lucas; Juan Antonio Yanes, both of Tucson, Ariz.

[73] Assignee: International Business Machines Corporation, Armonk, N.Y.

[21] Appl. No.: 08/969,842

[22] Filed: Nov. 13, 1997

[51] Int. Cl.$^7$ .............................. G06F 13/00; G11C 7/00
[52] U.S. Cl. ........................... 711/112; 711/111; 713/500
[58] Field of Search ................... 711/111, 112; 713/500; 714/800, 758, 752; 365/189.12; 710/62, 74

[56] References Cited

U.S. PATENT DOCUMENTS

| | | | |
|---|---|---|---|
| 4,254,473 | 3/1981 | Galdun et al. ............................. | 710/2 |
| 4,683,530 | 7/1987 | Quatse ....................................... | 710/2 |
| 4,860,193 | 8/1989 | Bentley et al. ........................... | 710/55 |
| 5,014,237 | 5/1991 | Masters et al. ........................... | 710/74 |
| 5,119,482 | 6/1992 | Lloyd ....................................... | 710/127 |
| 5,155,735 | 10/1992 | Nash et al. .............................. | 714/800 |
| 5,206,943 | 4/1993 | Callison et al. ........................ | 711/114 |
| 5,257,391 | 10/1993 | DuLac et al. ............................. | 710/10 |
| 5,461,701 | 10/1995 | Voth ......................................... | 358/1.1 |
| 5,469,545 | 11/1995 | Vanbuskirk et al. .................... | 709/234 |
| 5,488,694 | 1/1996 | McKee et al. ............................ | 710/4 |
| 5,504,929 | 4/1996 | Blair et al. .............................. | 710/65 |
| 5,535,333 | 7/1996 | Allen, Jr. et al. ...................... | 709/212 |
| 5,537,555 | 7/1996 | Landry et al. .......................... | 710/126 |
| 5,537,567 | 7/1996 | Galbraith et al. ...................... | 711/114 |
| 5,928,375 | 7/1999 | Lucas et al. ............................ | 714/752 |

OTHER PUBLICATIONS

High–Data–Rate Video Storage Using Hard Disk Drives, IBM Technical Disclosure Bulletin, vol. 37, No. 12, Dec. 1994, pp. 505–507.

Interface Bus Configuration, IBM Technical Disclosure Bulletin, vol. 26, No. 3B, Aug. 1983, pp. 1709–1711.

*Primary Examiner*—Eddie P. Chan
*Assistant Examiner*—Hong Kim
*Attorney, Agent, or Firm*—Robert M. Sullivan

[57] ABSTRACT

A data storage system is described which allows data storage devices with different characteristics, such as differing data rates and transfer speeds, to be connected, and intermixed, along a single data and communication link. The data storage system comprises a storage controller, a first data storage device, a second data storage device, and a data and communication link coupled therebetween. The storage controller transfers data to and from the first data storage device using data locations within the data and communication link to transfer a data byte, a parity location to transfer the associated parity bit, and a communication signal location to transfer a data clocking signal. The storage controller further transfers data to and from the second data storage device using the data locations to transfer a data byte and the parity location to transfer a data clocking, or a data strobe, signal. The storage controller also provides cyclic redundancy checking (CRC) to detect data transmission errors to the second device type, since the parity bit is no longer used to detect these errors.

22 Claims, 4 Drawing Sheets

INTERMIXING DIFFERENT DEVICES ALONG A SINGLE DATA COMMUNICATION LINK BY PLACING A STROBE SIGNAL IN A PARITY BIT SLOT

FIELD OF THE INVENTION

The present invention relates generally to the transmission of data within data processing systems, and more particularly, to a method and system for intermixing high speed and low speed data storage devices situated on a single device string, interconnected along a single data and communication link, and attached to a single port of a subsystem storage controller. The present invention allows a data storage device having a faster data rate and transfer speed to be introduced into a data storage subsystem designed to support slower speed data storage devices.

BACKGROUND OF THE INVENTION

Data processing systems typically contain a central processing unit, or host processor, to manage the movement of information, or data, between different peripheral data storage devices. The host processor is often connected to the data storage devices through a storage controller. The storage controller and attached storage devices comprise a data storage subsystem within the data processing system. The host processor typically executes control programs, or host applications, which generate data records to be stored on the data storage devices, and access data records previously stored on the data storage devices. The storage controller manages the data storage subsystem, and directs the transfer of the data records between the host processor and the data storage devices.

Data processing systems may consist of a single data storage subsystem, or may include multiple data storage subsystems. Each data storage subsystem typically includes a single group of data storage devices, such as direct access storage devices (DASDs), magnetic tape drives, or optical disk drives. Each group of data storage devices is connected to the host processing system through a separate storage controller. The storage devices are connected to the storage controller along data and communication links. A string of storage devices can be connected serially along the same data and communication link. Data storage subsystems currently connect storage devices with the same characteristics, such as storage capacity, storage density, transfer speed, and data rate, along the same string.

When the data storage subsystem needs to be updated with more advanced data storage devices, either because more storage capacity is required or a faster data rate is desired, an entire string of storage devices is currently replaced. In some instances, a string can consist of up to sixty-four storage devices, requiring an expensive and time-consuming modification to the data storage subsystem. It is therefore desired to intermix storage devices of the same group, such as DASD, but with different device characteristics, particularly DASDs with differing transfer speeds and data rates, along the same data and communication link in a data storage subsystem. Intermixing these storage devices allows for a subset of the devices along the same device string, connected to the same data and communication link, to be replaced with devices having a faster data rate and transfer speed within the data storage subsystem, thereby reducing the expense and resources involved in increasing the performance of the data storage subsystem. This affords greater flexibility in configuring data storage devices within the data storage subsystem.

Information is typically transferred between the storage controller and the data storage devices by sending data through the data and communication link, which consists of transmission lines. Information consists of communication signals and/or data bytes and may be transferred bi-directionally, in either direction, over the transmission lines. Synchronization signals, or clocking signals, often accompany the data bytes sent from the storage controller to the data storage device to validate the data on the transmission lines and coordinate the timing of the transmitted information between the storage controller and the data storage device. These signals notify the receiving device that the data bus contains valid information and cause the receiving device to latch the information from the data bus. These clocking signals correspond to the transfer speed and data rate of the data storage device. Thus, the storage controller must generate different clocking, or timing, signals when communicating with data storage devices having differing data rates.

Recently, advances have been made in the techniques used to clock the communication signals and data bytes between the storage controller and the data storage devices. A copending, commonly-assigned patent application, *Method for Enhancing Data Transmission in Parity Based Data Processing Systems,* Ser. No. 08/780,570, filed Jan. 8, 1997 (01/08/97), describes using a parity bit to clock the data byte when sending information from a transmitting device to a receiving device. Using the parity bit location to strobe, or clock, the data byte transmitted between the storage controller and the data storage device minimizes the time skew between the clock signal and the data occurring during data transmission, allows the data transfer to run at a faster transfer speed more closely approaching the system clock in the storage controller, and accommodates longer transmission lines between the storage controller and the data storage device.

Accordingly, an apparatus is needed to allow devices with different characteristics, such as differing data rates, to be connected to the same data and communication link, and share the same transmission lines, within a data storage subsystem. The present invention provides a storage controller with a data transfer component that uses conventional timing schemes to clock information to a first device, and also uses a parity bit location within a data bus to clock information to a second device, having a data rate substantially greater than the first device, along the same data and communication link. The data transfer component also uses an alternate means for detecting data transmission errors to the second device, since the parity bit is no longer used to detect these errors.

SUMMARY OF THE INVENTION

An object of the present invention is to provide an improved system and apparatus for allowing devices with different characteristics, such as differing data rates and transfer speeds, to be connected to the same data and communication link, and share the same transmission lines, within a data storage subsystem.

An embodiment of the present invention provides a data storage system comprising a storage controller, a first data storage device type, a second data storage device type, and a data and communication link coupled therebetween. The second data storage device type has a different set of device characteristics, particularly including a faster data rate and transfer speed. The storage controller consists of a microprocessor, a control store, an automatic data transfer (ADT) buffer, a data transmitting component, and a data receiving component. The data and communication link includes data locations for transmitting data between the storage controller and the first and second data storage device types and a parity location for transmitting a parity bit associated with the data byte. The data transmitting and data receiving components in the storage controller employ conventional timing schemes to clock data to the first device type, and use the parity bit location within the data link to clock information to the second device type. The data transmitting and receiving components also include cyclic redundancy checking (CRC) generator and comparator circuits to detect data transmission errors to the second device type, since the parity bit is no longer used to detect these errors.

The foregoing and other objects, features, and advantages of the invention will be apparent from the following more particular description of a preferred embodiment of the invention, as illustrated in the accompanying drawings.

DETAILED DESCRIPTION OF THE INVENTION

Figure 1:
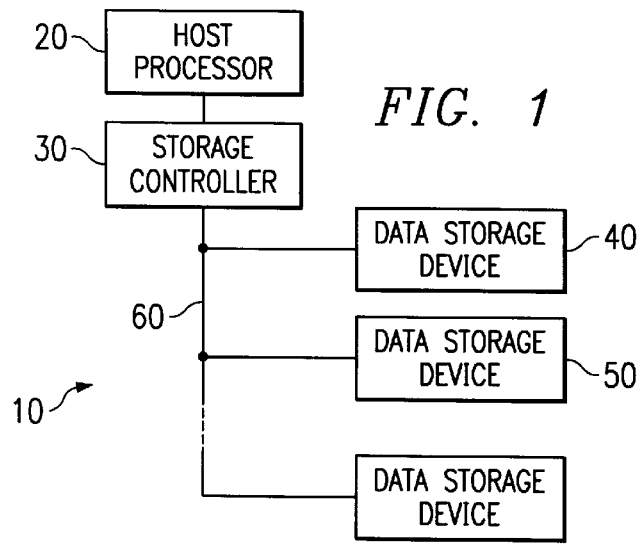
FIG. 1 is a block diagram showing an interconnection of functional components in a data storage system for intermixing data storage devices with different data rates and transfer speeds along a single data and communication link, in accordance with the present invention.

Referring more particularly to the drawing, like numerals denote like features and structural elements in the various figures. The invention will be described as embodied in a typical data storage system. Turning to FIG. 1, a data processing system 10 is shown consisting of a host processor 20, a storage controller 30, a first data storage device 40, a second data storage device 50, and a data and communication link 60 interconnecting the storage devices 40 50 to the storage controller 30. A typical host processor 20, such as an IBM System/370 or System/390, runs applications programs or software, such as Data Facility Storage Management Subsystem/Multiple Virtual Systems (DFSMS/MVS), to generate data records to be transferred to or subsequently received from a data storage subsystem. A typical storage controller 30, such as an IBM 3990, directs the data records between the host processor 20 and the different data storage devices 40 50. The second data storage device 50, such as an IBM RAMAC device, contains different device characteristics than the first data storage device 40, such as an IBM 3390 device, and more specifically, the second data storage device 50 provides a faster transfer speed and data rate than the first data storage device 40. The data and communication link 60, typically a group of electric transmission lines, transfers communication signals and data bytes between the interconnected storage controller 30 and the storage devices 40 50.

Figure 2:
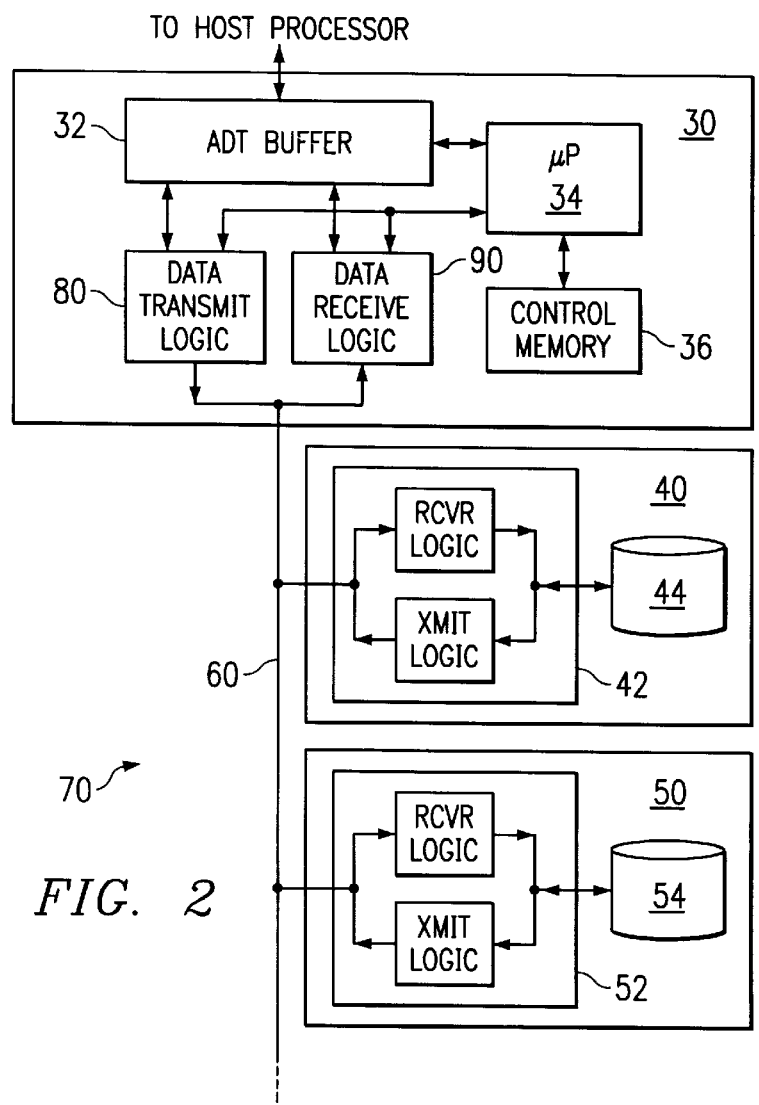
FIG. 2 is a block diagram showing in more detail a storage controller and data storage devices in the data storage system of FIG. 1, in accordance with the present invention.

FIG. 2 shows a data storage subsystem 70 consisting of the storage controller 30 and the data storage devices 40 50. The storage controller 30 includes an Automatic Data Transfer (ADT) buffer 32, a microprocessor 34 and a control memory 34, or control storage 34, a logic circuit 80 for transmitting data and control signals to the storage devices 40 50, and a logic circuit 90 for receiving data and control signals from the storage devices 40 50. The data and communication link 60 provides transmission lines for transferring the data and control signals to the first 40 and second 50 device types. A common set of transmission lines are used for transferring data to the separate device types, with each device type having different device characteristics, including differing transfer speeds and data rates. The ADT buffer 32 serves as a temporary storage for data records received from or transferred to the host processor 20. The microprocessor 34 provides a control center for the storage controller 30 in directing the data records between the host processor 20 and the first 40 or second 50 data storage device type. The control memory 36 contains executable program instructions and control information to assist the microprocessor 34 in directing the data records and controlling the data storage subsystem 70.

The first 40 and second 50 data storage device types provide a permanent storage in the data storage subsystem 70 for the data records generated in the host processor 20. In addition to the storage media 44 54, each data storage device 40 50 includes a device adapter 42 52 for latching the data and control signals from, and clocking the data and control signals onto, the data and communication link 60. Each device adapter 42 52 has logic circuits for transmitting data to and receiving data from the storage controller 30 along the data and communication link 60. The storage controller 30 sends and receives data using a common set of clock signals, whereas the first 40 and second 50 data storage devices send and receive data at data rates which differ from each other. Thus, if the data storage subsystem 70 is tuned to the data rate of the first data storage device 40, the data transfer logic circuits in the device adapter 52 of the second data storage device 50 must use a different technique for latching data transmitted with a common set of clock signals tuned to the first data storage device 40.

Figure 3:
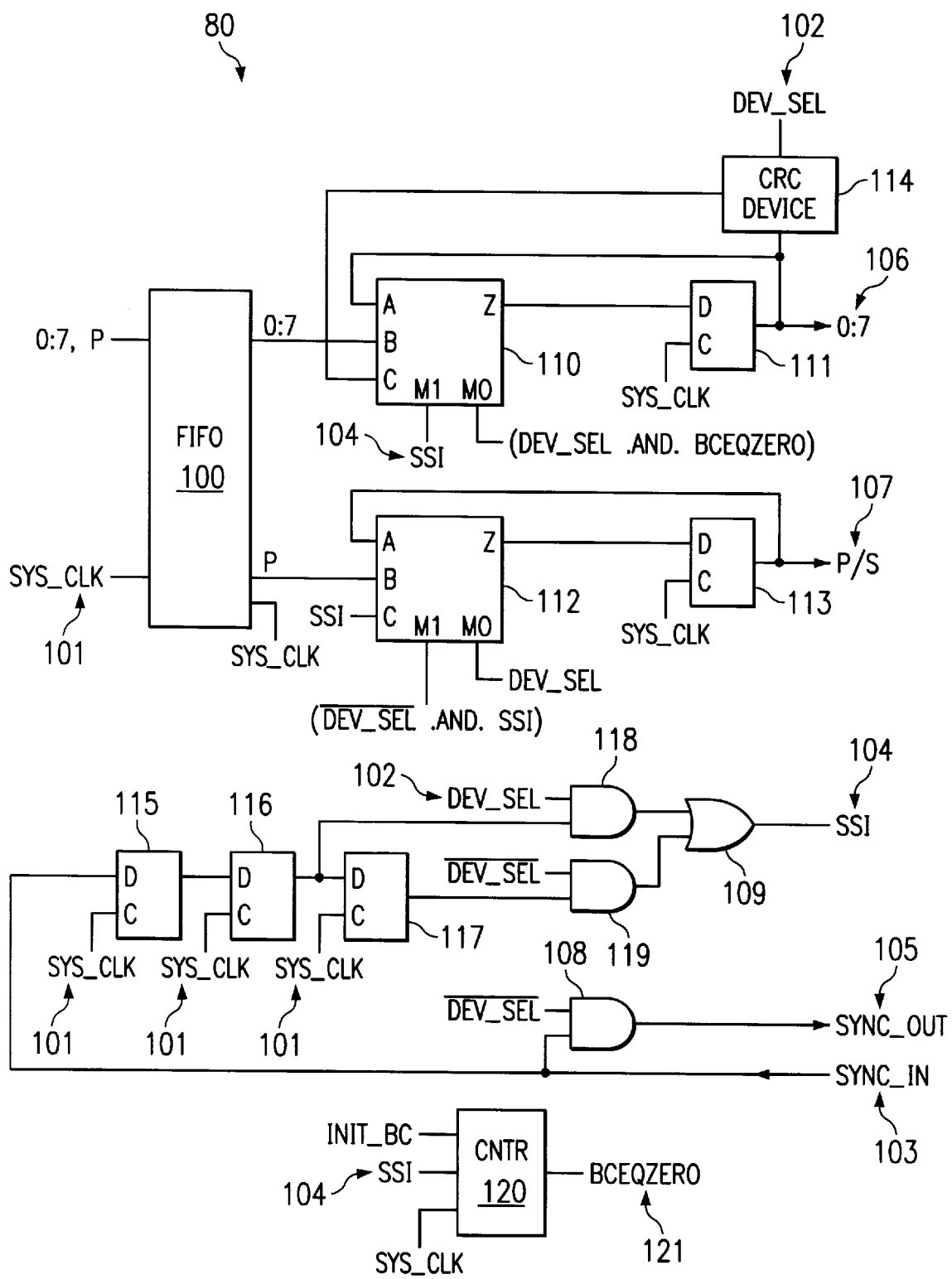
FIG. 3 is a block diagram showing data transfer logic for transmitting data from a storage controller in the data storage system of FIG. 1, in accordance with the present invention.

Referring to FIG. 3, a block diagram of a data transfer logic circuit 80 is shown for transmitting data from the storage controller 30 to the first 40 and second 50 device types. The data transfer logic 80 must transmit data to the first data storage device 40, when such device is selected and ready for data transfer, using a conventional technique of sending a data byte and a timing, or clocking, signal to latch the data byte at the receiving logic of the storage device 40. In addition, the data transfer logic must transmit data to the second storage device 50, when such device is selected and ready for data transfer, using an alternative technique where the parity bit location in the data link is used to strobe, or clock, the data to the storage device 50. The data transmitting logic 80 includes a first-in, first-out (FIFO) buffer circuit 100, a data multiplexor 110, a data latch 111, a parity/strobe multiplexor 112, a parity/strobe latch 113, and a cyclic redundancy checking (CRC) generator 114. In addition, the data transfer logic 80 includes circuitry for generating a synchronization signal, ssi 104, based on a data request signal from the device, sync-in 103. This circuit consists of three latches 115 116 117 and combinational logic 109 118 119.

A typical FIFO buffer circuit 100, such as Dual CMOS SyncFIFO with Part No. 72801 developed by Integrated Device Technology, Inc., can store several data bytes and their associated parity bits. The FIFO buffer 100 receives, at its input port, a data byte and a parity bit from the ADT buffer 32. The FIFO buffer 100 also receives a system clock 101 signal and uses such clock to propagate the data bytes and parity bits stored within the buffer according to a first in, first out queuing technique. The FIFO buffer 100 additionally contains output signals to notify any circuitry connected along its output ports that data is available at the outputs, or that the FIFO buffer 100 is either empty or full. In the current embodiment, an eight bit data multiplexor 110 is connected to the data byte output of the FIFO buffer 100. The output of the data multiplexor connects directly to a data latch 111, which is clocked by the same system clock 101 signal clocking the FIFO buffer 100. The data multiplexor 110 uses two logic input signals to select one of three data input signals as its output signal. The three data inputs include the data byte currently latched in the eight bit data latch 111, the next, or new, data byte from the FIFO buffer 100, or the output data byte from the CRC generator 114. The output of the data latch 111 is coupled to the data and communication link 60, which transmits the data byte to the selected data storage device 40 50.

The current embodiment similarly connects a single bit parity/strobe multiplexor 112 to the parity bit output of the FIFO buffer 100. The output of the parity/strobe multiplexor is coupled to a single bit parity/strobe latch 113, which is also clocked by the system clock 101 signal. The parity/strobe multiplexor 110 uses two logic input signals to select one of three data input signals as its output signal. The three data inputs include the parity bit or strobe signal currently latched in the parity/strobe latch 113, the next, or new, parity bit from the FIFO buffer 100, or the ssi timing signal 104. The output of the parity/strobe latch 113 is coupled to the data and communication link 60, which transmits either the parity bit 107 to the low speed device 40 or the strobe signal 107 to the high speed device 50 depending on which type of device is selected.

The current embodiment of the data transfer logic 80 further includes circuitry to receive a request for data signal, sync-in 103, from the selected data storage device 40 50 and to generate a synchronization signal, ssi 104, corresponding to the device request for data. This portion of the data transfer logic 80 consists of a first delay latch 115, a second delay latch 116, a third delay latch 117, and combinational logic 108 109 118. The device request for data, sync-in 103, is received from the data and communication link 60 and as an input to the first delay latch 115 and an AND gate 108. The data request signal, sync-in 103, is ANDed with a device selection signal, dev-sel 102, to generate a data request acknowledgement signal, sync-out 105, to the selected data storage device. More particularly, the AND gate 108 returns the sync-in signal 103 along the data and communication link 60 as a sync-out signal 105 when the device selection signal, dev-sel 102, indicates that a low speed device 40 is selected.

The sync-in signal 103 is delayed two clock cycles through the first 115 and second 116 delay latches. The output of the second delay latch 116 is connected to an input of an AND gate. When the device selection signal, dev-sel 102, is set, indicating that a high speed device 50 is selected, the synchronization signal, ssi 104, is generated from the second delay latch 116. In addition, the output of the second delay latch 116 is connected to the data input of the third delay latch 117, thereby delaying the sync-in signal 103 for a third clock cycle. When the device selection signal, dev-sel 102, is reset, indicating that a low speed device 40 is selected, the synchronization signal, ssi 104, is generated from the third delay latch 117. Thus, the ssi signal 104 is delayed two clock cycles when a high speed device 50 is selected, and three clock cycles when a low speed device 40 is selected.

The data transfer logic also includes a CRC generator 114, in the current embodiment, which receives the data byte output of the data latch 111 and calculates a redundancy check value. The CRC generator 114 is enabled when the device selection signal, dev-sel 102, indicates that a high speed storage device 50 is selected. The redundancy check byte is transmitted to the high speed device 50 to determine whether an error occurred in the transmission of the data chain from the storage controller 30 to the high speed device 50. Such redundancy checking is needed since the parity location along the data and communication link 60 is used to strobe the data to the high speed device, and not for detecting errors in data transmission. Finally, the data transfer logic includes a counter 120 which receives an initial byte count, init-bc, from the microprocessor 34 prior to the transfer of a data chain to a selected high speed device 50. The counter 120 uses the ssi signal 104 to decrement the initial byte count and generate an output signal, bceqzero 121, when the initial byte count decrements to zero. This output signal, bceqzero 121, is used by the data multiplexor 110 to select the redundancy check byte from the CRC generator 114 as the input to the data latch 111 for transmission along the data and communication link 60 to the high speed storage device 50.

Accordingly, the device transfer logic 80 receives the following input signals: a device selection signal 102 set by the control programs executing in the microprocessor 34, a data byte from the ADT buffer 32, a parity bit associated with the data byte from the ADT buffer 32, a data request signal 103 from the selected storage device 40 50. The data transfer logic 80 generates the following output signals to a device 40 with a first set of device characteristics, a low speed device 40 in the current embodiment: a data byte to be transferred to the selected device 40 along the data and communication link 60, a parity bit associated with the data byte, and a data request acknowledgement signal 105 to clock the data at the low speed device 40. Correspondingly, the data transfer logic 80 generates the following output signals when a device 50 having a second set of device characteristics, a high speed device 50 in the present embodiment, is selected: a data byte and a strobe signal in the parity bit location of the data and communication link 60 to clock the data byte at the high speed device 50.

Figure 4:
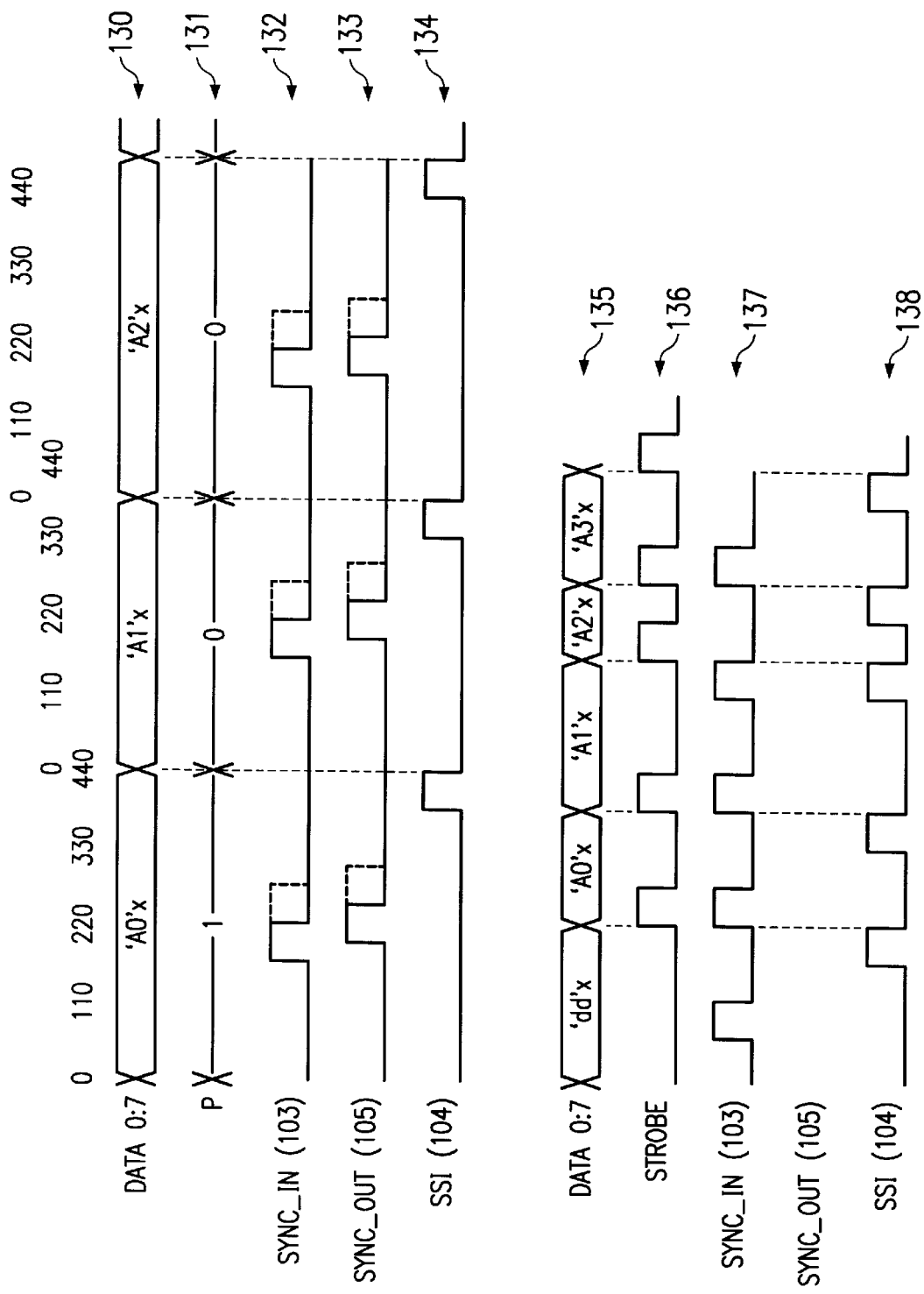
FIG. 4 is a timing diagram corresponding to the data transfer logic of FIG. 3, in accordance with the present invention.

The timing diagrams in FIG. 4 illustrate the operation of the data transfer logic 80 in FIG. 3 to transmit data to both a low speed device 40 and a high speed device 50, the first and second device types in the present embodiment. The first five timing lines 130–134 relate to the low speed device 40 type. In the current illustrative embodiment, the low speed device 40 has a data interval of 440 nanoseconds (ns). The device 40 sends a data request signal, sync-in 103, at a time interval of every 440 ns along the data and communication link 60, as is shown in the timing line 133. The data transfer logic 80 in the storage controller 30 receives the sync-in signal 103 and returns a data request acknowledgement signal, sync-out 105, which is also used by the low speed device to clock, or latch, the data byte 130. The sync-out signal 105 is generated since the device selection signal 102 reset by the microprocessor 34 indicates that a low speed 40, or first device type is selected.

The data transfer logic 80 also generates a synchronization signal, ssi 104, to latch the next available data byte from the FIFO buffer 100 to the data and communication link 60. Since the dev-sel 102 signal is reset, the ssi signal 104 is delayed three system clock, sys-clk 101, cycles. In the current illustrative embodiment, the system clock, sys-clk 104, operates at 55 ns intervals. Since the sync-in signal 103 occurs asynchronously when compared to the system clock, sys-clk 101, the ssi signal 104 can be delayed from 165 ns to 220 ns after the logic 80 detects the arrival of sync-in, depending on which clock cycle latched the sync-in signal at the first delay latch 115. The ssi signal 104 serves as one of the two selection inputs to the data multiplexor 110. When the ssi signal 104 is reset, the multiplexor 110 selects the current data byte latched in the data latch 111 to remain latched in the data latch 111. When the ssi signal 104 is set, or pulses high, the data multiplexor 110 selects the next available data byte within the FIFO buffer 100 to be latched into the data latch 111. The output of the data latch 111 is coupled to the data and communication link 60 and transmitted to the selected data storage device 40. The ssi timing line 134 shows the changing of the data byte 130 at the falling edge of the ssi signal 104.

In a similar manner, the ssi signal 104 latches the parity bit 131 in the parity latch 113, when the device selection signal, dev-sel 102, is reset, indicating that a low speed device 40 is selected. The ssi signal 104 is coupled to the dev-sel 102 signal and serves as one of the two selection inputs to the parity/strobe multiplexor 112. When the ssi signal 104 is reset, the multiplexor 112 selects the current parity bit latched in the parity/strobe latch 113 to remain latched in the latch 113. When the ssi signal 104 is set, or pulses high, the parity/strobe multiplexor 112 selects the next available parity bit within the FIFO buffer 100 to be latched into the parity/strobe latch 113. The output of the parity/strobe latch 113 is coupled to the parity bit location in the data and communication link 60 and transmitted to the selected low speed storage device 40.

The ssi timing line 134 shows the changing of the parity bit 131 at the falling edge of the ssi signal 104.

The last four timing lines 135–138 relate to the high speed device 50 type. In the current exemplary embodiment, the high speed device 40 has a data interval of 165 nanoseconds (ns). The device 50 sends a data request signal, sync-in 103, at a time interval of every 165 ns along the data and communication link 60, as is shown in the timing line 137. The data transfer logic 80 in the storage controller 30 receives the sync-in signal 103, but does not return a data request acknowledgement signal, sync-out 105, since the device selection signal, dev-sel 102, is set indicating that a high speed device 50 is selected. The sync-out 105 signal is not used by the high speed device 50 to clock, or latch, the data byte 135.

As described earlier, the data transfer logic 80 generates a synchronization signal, ssi 104, to latch the next available data byte from the FIFO buffer 100 to the data and communication link 60. Since the dev-sel 102 signal is set, the ssi signal 104 is delayed only two system clock, sys-clk 101, cycles, or 110 ns in the current illustrative embodiment. As stated previously, the ssi signal 104 can be delayed from 110 ns to 165 ns after the logic 80 detects the arrival of sync-in, depending on which clock cycle latches the sync-in signal at the first delay latch 115. When the ssi signal 104 is reset, the data multiplexor 110 selects the current data byte latched in the data latch 111 to remain latched in the data latch 111. When the ssi signal 104 is set, or pulses high, the data multiplexor 110 selects the next available data byte within the FIFO buffer 100 to be latched into the data latch 111. The output of the data latch 111 is coupled to the data and communication link 60 and transmitted to the selected data storage device 40. The ssi timing line 138 shows the changing of the data byte 135 at the falling edge of the ssi signal 104.

The ssi signal 104 additionally directs the output of the CRC generator 114 to be selected by the data multiplexor 110, subsequently latched in the data latch 111, and transmitted along the data and communication link 60 to the selected high speed device 50 when the bceqzero signal 121 is active. As stated earlier, the bceqzero signal 121 is generated by the counter 120 when the initial byte count of the data chain decrements to zero, indicating that all the data bytes in the data chain have been transmitted to the high speed device 50. The output of the CRC generator 114, a redundancy check byte in the current embodiment, is used to determine whether errors occurred during the transmission of the data bytes along the data and communication link 60 between the storage controller 30 and the high speed device 50.

The ssi signal 104 also generates the strobe 136, or clocking, signal transmitted in the parity bit location of the data and communication link 60 and used to latch the data byte 135 at the high speed device 50. The device selection signal, dev-sel 102, serves as one of the selection inputs to the parity/strobe multiplexor 112, while the ssi signal 104 serves as one of the data inputs to the multiplexor 112. When the device selection signal, dev-sel 102, is set, indicating that a high speed device 50 is selected, the parity/strobe multiplexor 112 selects the ssi signal 104 as its output, to be latched in the parity/strobe latch 113. Thus, the strobe signal 136 consists of the ssi signal 104 delayed by one clock cycle, as reflected in timing lines 136 and 138. The strobe is transmitted in the parity location of the data and communication link 60. By coupling a reset dev-sel 102 signal to the other selection input of the multiplexor 112, a parity bit is only propagated along the data and communication link 60 when a low speed device 40 is selected. The ssi timing line 138 shows that the rising edge of the strobe signal 136 coincides with the falling edge of the ssi signal 104.

Figure 5:
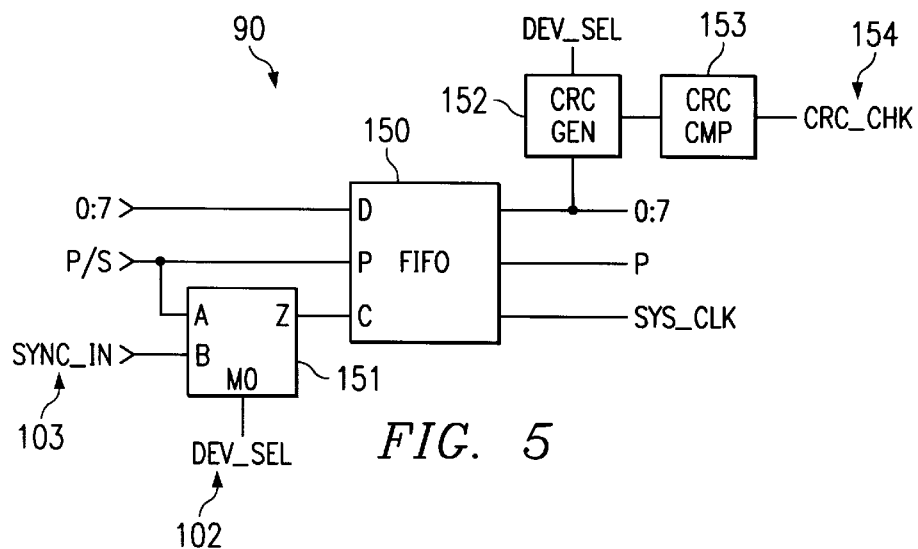
FIG. 5 is a block diagram showing data transfer logic for receiving data in the storage controller of the data storage system of FIG. 1, in accordance with the present invention.

Referring to FIG. 5, a block diagram of a data transfer logic circuit 90 is shown for receiving data in the storage controller 30 from a first 40 and second 50 device type. As referenced earlier, the data transfer logic 90 must receive data from the first, or low speed, data storage device 40, when such device is selected and ready for data transfer, using a conventional technique of latching a data byte using a timing, or clocking, signal. In addition, the data transfer logic 90 must receive data from the second, or high speed, storage device 50, when such device is selected and ready for data transfer, using an alternative technique where a parity bit location in the data and communication link 60 is used to strobe, or clock, the data. The data receiving logic 90 includes a FIFO buffer circuit 150, a multiplexor 151, a CRC generator 152, and a CRC comparator 153. The FIFO buffer 150, similar to the Dual CMOS SyncFIFO (Part No. 72801)

developed by Integrated Device Technology, Inc. and described in FIG. 3, contains a data byte input, a parity bit input, and a clock input for latching the data byte and parity bit. The FIFO buffer 150 also contains outputs for a data byte, a parity bit, and a clock signal.

In the current embodiment, the FIFO buffer 150 receives a data byte and a parity bit from the data and parity locations of the data and communication link 60. A multiplexor 151 is coupled to the clock input of the FIFO buffer 150. The device selection signal, dev-sel 102, set by the microprocessor 34 when a high speed device 50 is selected, serves as the selection input to the multiplexor 151. The parity bit location of the data and communication link 60 and the data request signal, sync-in 103, are coupled to the two data inputs to the multiplexor 151. When the dev-sel signal 102 is reset, a low speed device 40 is selected and a conventional clocking technique is used to latch the data byte from the data and communication link 60. The multiplexor 151 selects the sync-in signal 103 from the data and communication link as the clock input to the FIFO buffer 150. Thus, the sync-in signal 105 latches the data byte and parity bit from the data and parity locations of data and communication link 60 into the FIFO buffer 150. When the dev-sel signal 102 is set, a high speed device 50 is selected and an alternate clocking technique is used to latch the data byte from the data and communication link 60. The multiplexor 151 selects the strobe signal 136 from the parity location in the data and communication link 60 as the clock input to the FIFO buffer 150. Thus, the strobe signal 136 latches the data byte from the data locations of the data and communication link 60 into the FIFO buffer 150.

The data bytes are subsequently transferred from the FIFO buffer 150 to the ADT buffer 32 within the storage controller 30, according to the first-in first-out queuing technique of the FIFO buffer 150. The data output of the FIFO buffer 150 is also coupled to a CRC generator circuit 152. This CRC generator 152 employs the same algorithm used by the data transmitting circuit to calculate an redundancy check value. The CRC comparator 153 then compares the calculated redundancy check value with the expected redundancy check value to determine if an error occurred along the data and communication link during the data transmission. The CRC comparator 153 generates a CRC check signal 154 when the comparison fails. In the current embodiment, the expected redundancy check value is calculated by performing an exclusive OR operation on each data byte in the data chain. Thus, the CRC comparator 153 simply needs to compare the calculated redundancy check value with zero to determine if an error occurred while transmitting the data chain along the data and communication link 60. A CRC check signal 154 is generated if the calculated redundancy value does not equal zero.

Figure 6:
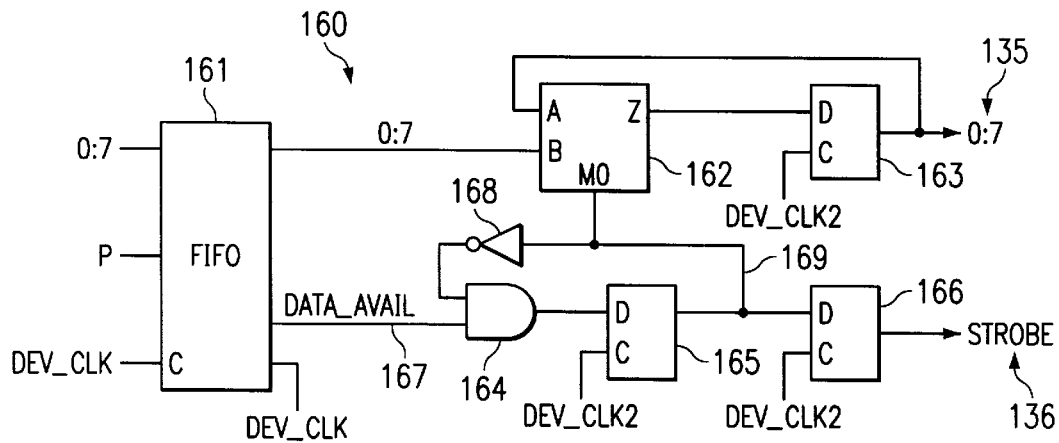
FIG. 6 is a block diagram showing data transfer logic for transmitting data from a second data storage device type intermixed along a data and communication link in the data storage system of FIG. 1, in accordance with the present invention.
Figure 7:
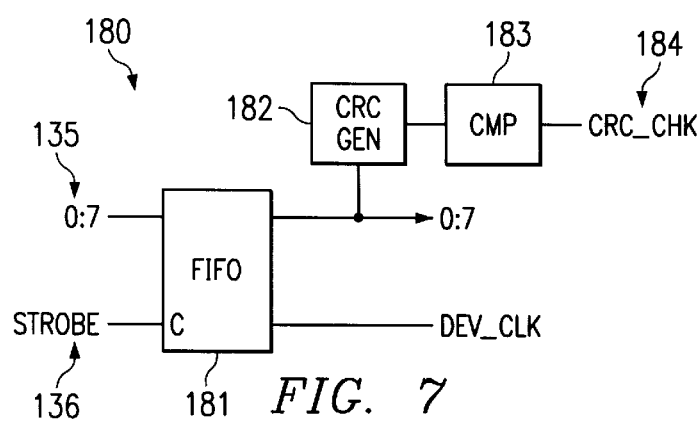
FIG. 7 is a block diagram showing data transfer logic for receiving data in the second data storage device type intermixed along a data and communication link in the data storage system of FIG. 1, in accordance with the present invention.

FIGS. 6 and 7 show block diagrams representing an exemplary embodiment of the data transfer logic needed in the device adapter 52 of the high speed storage device 50 for transmitting and receiving data between the device 50 and the storage controller 30. As stated earlier, attaching a high speed device 50 to a string of low speed devices connected along a single data and communication link 60 requires an alternate clocking technique to latch the data byte from the data link 60. The current embodiment sends a strobe signal 136 in the parity location of the data and communication link 60 to clock, and latch, the data byte transmitted in the corresponding data locations of the data link 60. Thus, the data transmitting 160 and data receiving 180 logic within the device adapter 52 of the high speed storage device 50 must accommodate a strobe signal 136 in the parity location of the data and communication link 60 and a technique for determining whether errors occurred in the data transmission.

Referring to FIG. 6, a block diagram is shown of data transfer circuitry 160 for transmitting a data byte from the high speed storage device 50 to the storage controller 30. In the present embodiment, the data transmitting logic 160 receives a data byte and its associated parity bit from the permanent storage media 54 in the high speed device 50 and transmits a data byte 135 and a strobe signal 136 along the data and communication link 60 to the storage controller 30. The data transmitting logic 160 includes a FIFO buffer 161, a multiplexor 162, a data latch 163, a first strobe latch 165, a second strobe latch 166, and a combinational logic gate 164. As previously described, the FIFO buffer 161 temporarily stores data bytes received at its data inputs in a first in, first out queue. A data byte and its associated parity bit are clocked into the FIFO buffer 161 using a device clock interval, dev-clk, equivalent to the transfer speed of the high speed storage device 50. In the present embodiment, the data transmitting logic 160 operates using a clock signal, dev-clk2, running twice the transfer speed of the high speed device 50 and having a time interval of one-half the device clock, dev-clk.

The data output of the FIFO buffer 161 is coupled to an eight bit multiplexor 162 and an eight bit data latch 162 to propagate the data byte to the data and communication link 60. The FIFO buffer 161 also contains a data available output port, data-avail 167, to signal when valid data exists on the data ports of the FIFO buffer 161. The data available 167 output of the FIFO buffer 161 is coupled to a combinational logic gate 164, and a first 165 and second 166 strobe latch to generate a strobe signal 136 along the parity location of the data and communication link 60.

The output of the first strobe latch 165 is connected back through an inverter 168 to the combinational logic gate 164 to form a data toggle signal 169, and is also coupled to the selection input of the multiplexor 162. When the data toggle signal 169 is high, the multiplexor 161 selects a next, or new, data byte from the data output of the FIFO buffer 161 and propagates such data byte to the data latch 162. When the data toggle signal 169 is low, the multiplexor 161 selects the data byte currently latched in the data latch 162 as the multiplexor output. The output of the data latch 162 is transmitted along the data locations of the data and communication link 60 to the storage controller 30.

The data-avail 167 signal remains active for as long as the next data byte is available on the output ports of the FIFO buffer 161. The combinational logic gate 164 and the two strobe latches 165 and 166 are used to generate the strobe signal 136 needed to latch the data byte 135 at the data receiving circuit in the storage controller. As mentioned earlier, the strobe signal 136 is transmitted along the parity location of the data and communication link 60. The strobe latches 165 166 are clocked using dev-clk2 to coordinate the strobe signal with the transmission of the data byte 135 along the data and communication link 60. Two latches 165 166 are used to generate a clock pulse which is active for one-half of the device clock, dev-clk, interval and subsequently inactive for a second one-half device clock interval.

FIG. 7 shows a block diagram of the data transfer logic 180 for receiving data, in the high speed storage device 50, from the storage controller 30. The data receiver logic 180 consists of a FIFO buffer 181, a CRC generator 182, and a CRC comparator 183. The FIFO buffer 181, as previously described, receives a data byte 135 at its data input and a strobe signal 136 at its clock input. The strobe signal 136 allows the FIFO buffer 181 to latch the data byte into the internal FIFO registers. The FIFO buffer 181 temporarily holds the data bytes and uses a first in, first out queuing technique to place the data bytes on the output ports of the FIFO buffer 181. The data bytes are then transferred to the storage media 54 of the high speed storage device 50 for permanent storage within the data storage system 10.

The FIFO buffer 181 data output ports are also coupled to the CRC generator 182. The CRC generator 182 employs the same algorithm used by the data transmitting circuit 80 in the storage controller 30 to calculate an redundancy check value. The CRC comparator 153 then compares the calculated redundancy check value with the expected redundancy check value transmitted from the storage controller 30 to determine if an error occurred along the data and communication link 60 during the transmission of the data chain. The CRC comparator 153 generates a CRC check signal 154 when the comparison fails. As described earlier, the current embodiment calculates the expected redundancy check value by performing an exclusive OR operation on each data byte in the data chain. Thus, the CRC comparator 153 simply needs to compare the calculated redundancy check value with zero to determine if an error occurred while transmitting the data chain along the data and communication link 60. A CRC check signal 154 is generated if the calculated redundancy value does not equal zero.

While the invention has been particularly shown and described with reference to preferred embodiments thereof, it will be understood by those skilled in the art that various changes in form and details may be made therein without departing from the spirit and scope of the invention. For example, the present embodiment of the invention illustrates a single byte transfer of data along the data link between the storage controller and the data storage devices. However, the invention could be used to concurrently transfer two or more data bytes, with each data link containing data bit locations for transferring a data byte and a parity bit location for transmitting either a parity bit or a strobe signal. This configuration effectively doubles the data transfer rate without increasing the transfer speed of the data storage devices.

What is claimed is:

1. A data storage system comprising:
    a first data storage device for storing data, said first data storage device having a set of device characteristics;
    a second data storage device for storing data, said second data storage device having a set of device characteristics different from said set of device characteristics pertaining to said first data storage device;
    a storage controller for initiating and directing a transfer of said data to and from said first and said second data storage devices; and
    a data link for transmitting said data, said data link coupled between said storage controller and said first and said second data storage devices, said data link including data bit slots, a parity bit slot, and communication signal slots,
    wherein said storage controller transmits data to and receives data from said first data storage device using said data bit slots to transfer a first data byte, said parity bit slot to transfer a parity bit associated with said first data byte, and one of said communication signal slots to transfer a data clocking signal, and
    wherein said storage controller further transmits data to and receives data from said second data storage device using said data bit slots to transfer a second data byte, and said parity bit slot to transfer a data strobe signal.

2. The data storage system in claim 1 wherein said storage controller further comprises:
    a data transmitting circuit coupled to said data link for transferring said data to said first and said second data storage devices;
    a data receiving circuit for latching said data from said data link, said data transferred from said first and second data storage devices;
    an automatic data transfer (ADT) buffer coupled to said data transmitting and said data receiving circuits, said ADT buffer for storing said data within said storage controller; and
    a microprocessor coupled to said data receiving circuit, said data transmitting circuit, and said ADT buffer, said microprocessor directing said data between said ADT buffer and said data transmitting and said data receiving circuits, said microprocessor executing control instructions stored in a control memory.

3. The data storage system in claim 2 wherein said data transmitting circuit further comprises:
    a data latch coupled to said data bit slots of said data link;
    a first in, first out (FIFO) register for receiving a next data element and a next parity bit from said ADT buffer; and
    a data multiplexor coupled between said FIFO register and said data latch, said data multiplexor selecting whether a current data element should remain in, or said next data element should be latched into, said data latch and transmitted along said data link.

4. The data storage system in claim 2 wherein said data transmitting circuit further comprises:
    a parity latch coupled to said parity bit slot of said data link; and
    a parity multiplexor coupled between said FIFO register and said parity latch, said parity multiplexor selecting whether said current parity bit should remain or said next parity bit should be latched into said parity latch and transmitted along said data link to said first data storage device, said parity multiplexor further selecting said strobe signal to be latched in said parity latch and transmitted along said data link to said second data storage device.

5. The data storage system in claim 4 wherein said microprocessor generates a device selection signal to indicate whether said first data storage device or said second data storage device is selected for data transfer.

6. The data storage system in claim 5 wherein said parity multiplexor selects said strobe signal to be latched into said parity latch when said device selection signal indicates said second data storage device is selected, and said parity multiplexor selects said parity bit to be latched in said parity latch when said device selection signal indicates said first data storage device is selected.

7. The data storage system in claim 6 wherein said data transmitting circuit further comprises:
    a cyclic redundancy check (CRC) generator coupled to said data latch for calculating a redundancy check value, said CRC generator enabled when said device selection signal indicates that said second data storage device is selected for data transfer, said redundancy check value transmitted in said data bit slots of said data link to determine if an error occurred while transmitting a series of said data elements to said second data storage device.

8. The data storage system in claim 7 wherein said data receiving circuit further comprises:

a FIFO register for latching said next data element from said data link, and transferring said current data element to said ADT buffer; and a strobe multiplexor coupled between said FIFO register and said parity location of said data link, said strobe multiplexor selecting said next parity bit to be latched into a parity input in said FIFO register, said strobe multiplexor further selecting said strobe signal to be clocked into a clock input of said FIFO register.

9. The data storage system in claim 8 wherein said strobe multiplexor selects said strobe signal to be clocked into said clock input of said FIFO register when said device selection signal indicates said second data storage device is selected for data transfer, and said strobe multiplexer selects said next parity bit to be latched in said parity input of said FIFO register when said device selection signal indicates said first data storage device is selected for data transfer.

10. The data storage system in claim 8 wherein said data receiving circuit further comprises:
   a CRC generator coupled to a data output of said FIFO register for calculating an estimated redundancy check value, said CRC generator enabled when said device selection signal indicates that said second data storage device is selected for data transfer; and
   a CRC comparator coupled to said CRC generator for comparing said estimated redundancy check value with an expected redundancy check value to determine if an error occurred while transmitting a series of said data elements from said second data storage device.

11. The data storage system in claim 1 wherein said second data storage device transfers data at a faster transfer speed than said first data storage device.

12. The data storage system in claim 1 wherein said first and said second data storage devices are direct access storage devices (DASDs).

13. A storage controller in a data storage system for initiating and directing a transfer of data to and from a first data storage device and a second data storage device, said second data storage device having a different set of device characteristics than said first data storage device, said storage controller coupled to said first and said second data storage device through a data link, said storage controller comprising:
   a data transmitting circuit coupled to said data link for transferring said data to said first and said second data storage devices; and
   a data receiving circuit for latching said data from said data link, said data transferred from said first and second data storage devices,
   wherein said storage controller transmits data to and receives data from said first data storage device using a plurality of data bit slots in said data link to transfer a first data byte, a parity bit slot in said data link to transfer a parity bit associated with said first data byte, and a communication signal slot in said data link to transfer a data clocking signal, and
   wherein said storage controller further transmits data to and receives data from said second data storage device using said plurality of data bit slots to transfer a second data byte, and said parity bit slot to transfer a data strobe signal.

14. The storage controller in claim 13 further comprising:
   an automatic data transfer (ADT) buffer coupled to said data transmitting and said data receiving circuits, said ADT buffer for storing said data within said storage controller; and
   a microprocessor coupled to said data receiving circuit, said data transmitting circuit, and said ADT buffer, said microprocessor directing said data between said ADT buffer and said data transmitting and said data receiving circuits, said microprocessor executing control instructions stored in a control memory.

15. The storage controller in claim 14 wherein said data transmitting circuit further comprises:
   a data latch coupled to said data bit slots of said data link;
   a first in, first out (FIFO) register for receiving a next data element and a next parity bit from said ADT buffer; and
   a data multiplexor coupled between said FIFO register and said data latch, said data multiplexor selecting whether a current data element should remain in, or said next data element should be latched into, said data latch and transmitted along said data link.

16. The storage controller in claim 14 wherein said data transmitting circuit further comprises:
   a parity latch coupled to said parity bit slot of said data link; and
   a parity multiplexor coupled between said FIFO register and said parity latch, said parity multiplexor selecting whether said current parity bit should remain or said next parity bit should be latched into said parity latch and transmitted along said data link to said first data storage device, said parity multiplexor further selecting said strobe signal to be latched in said parity latch and transmitted along said data link to said second data storage device.

17. The storage controller in claim 16 wherein said microprocessor generates a device selection signal to indicate whether said first data storage device or said second data storage device is selected for data transfer.

18. The storage controller in claim 17 wherein said parity multiplexor selects said strobe signal to be latched into said parity latch when said device selection signal indicates said second data storage device is selected, and said parity multiplexor selects said parity bit to be latched in said parity latch when said device selection signal indicates said first data storage device is selected.

19. The storage controller in claim 18 wherein said data transmitting circuit further comprises:
   a cyclic redundancy check (CRC) generator coupled to said data latch for calculating a redundancy check value, said CRC generator enabled when said device selection signal indicates that said second data storage device is selected for data transfer, said redundancy check value transmitted in said data bit slots of said data link to determine if an error occurred while transmitting a series of said data elements to said second data storage device.

20. The storage controller in claim 19 wherein said data receiving circuit further comprises:
   a FIFO register for latching said next data element from said data link, and transferring said current data element to said ADT buffer; and
   a strobe multiplexor coupled between said FIFO register and said parity location of said data link, said strobe multiplexor selecting said next parity bit to be latched into a parity input in said FIFO register, said strobe multiplexor further selecting said strobe signal to be clocked into a clock input of said FIFO register.

21. The storage controller in claim 20 wherein said strobe multiplexor selects said strobe signal to be clocked into said clock input of said FIFO register when said device selection signal indicates said second data storage device is selected for data transfer, and said strobe multiplexor selects said next parity bit to be latched in said parity input of said FIFO register when said device selection signal indicates said first data storage device is selected for data transfer.

22. The storage controller in claim 20 wherein said data receiving circuit further comprises:

a CRC generator coupled to a data output of said FIFO register for calculating an estimated redundancy check value, said CRC generator enabled when said device selection signal indicates that said second data storage device is selected for data transfer; and a CRC comparator coupled to said CRC generator for comparing said estimated redundancy check value with an expected redundancy check value to determine if an error occurred while transmitting a series of said data elements from said second data storage device.

* * * * *